US008451906B1

(12) United States Patent
Rajagopalan et al.

(10) Patent No.: US 8,451,906 B1
(45) Date of Patent: May 28, 2013

(54) RECONSTRUCTING EFFICIENTLY ENCODED VIDEO FRAMES IN A DISTRIBUTED VIDEO CODING ENVIRONMENT

(75) Inventors: Shyam Sundar Rajagopalan, Bangalore (IN); Deepak Pai, Bangalore (IN); Shriram V. Revankar, Bangalore (IN); Arsh Sood, New Delhi (IN); Parimi Krishna Chaitanya, Visakhapatnam (IN)

(73) Assignee: Adobe Systems Incorporated, San Jose, CA (US)

( * ) Notice: Subject to any disclaimer, the term of this patent is extended or adjusted under 35 U.S.C. 154(b) by 314 days.

(21) Appl. No.: 13/035,242

(22) Filed: Feb. 25, 2011

(51) Int. Cl.
*H04N 11/02* (2006.01)
*G06K 9/36* (2006.01)

(52) U.S. Cl.
USPC ............... 375/240.24; 375/240.25; 382/238; 382/244

(58) Field of Classification Search
USPC ....................................... 375/240.01–240.29
See application file for complete search history.

(56) References Cited

U.S. PATENT DOCUMENTS

| | | | | |
|---|---|---|---|---|
| 6,600,786 | B1 * | 7/2003 | Prakash et al. | 375/240.25 |
| 7,136,394 | B2 * | 11/2006 | Horowitz et al. | 370/468 |
| 8,054,887 | B2 * | 11/2011 | Keesen | 375/240.24 |
| 8,238,444 | B2 * | 8/2012 | Huang et al. | 375/240.27 |

OTHER PUBLICATIONS

U.S. Appl. No. 13/035,223, filed Feb. 25, 2011, Adobe Systems Incorporated, all pages.
Bernd Girod, et al., "Distributed Video Coding," Proceedings of the IEEE, vol. 93, No. 1, Jan. 2005, 13 pages.
Sriram Rangarajan, et al., "Spatial Histograms for Head Tracking," A Thesis presented to the Graduate School of Clemson Univ., Dec. 16, 2005, 63 pages.
Adrian Ulges, et al., "Spatiogram-Based Shot Distances for Video Retrieval," 2010, 10 pages.
Stanley T. Birchfield, et al., "Spatial Histograms for Region-Based Tracking," ETRI Journal, vol. 29, No. 5, Oct. 2007, 3 pages.
Stanley T. Birchfield, et al., "Spatiograms Versus Histograms for Region-Based Tracking," 2005 IEEE, 6 pages.
Bethany Adams and Nina Manual, "Using the Singular Value Decomposition Particularly for the Compression of Color Images," Nov. 13, 2005, 9 pages.
"Singular Value Decomposition," Com S 477/577, Oct. 26, 2011, 9 pages.

* cited by examiner

*Primary Examiner* — David Czekaj
*Assistant Examiner* — Leron Beck
(74) *Attorney, Agent, or Firm* — Wolfe-SBMC

(57) ABSTRACT

Systems and methods are presented for reconstructing sequences of video frames received from a sending device in a distributed video coding environment. Some of the video frames are received as key video frames fully encoded at the sending device. Others are received as non-key video frames partitioned into pixel blocks. Some of the pixel blocks are indicated for reconstruction via a corresponding previous pixel block of a previous video frame, while other pixel blocks are to be reconstructed by decoding encodings of those pixel blocks received from the sending device. Each received encoding of a pixel block is based on contents of the non-key video frame that contains the pixel block and not on contents of the previous key video frame, nor on contents of any other video frame positioned between the previous key video frame and the non-key video frame in the sequence of video frames.

20 Claims, 7 Drawing Sheets

RECONSTRUCTING EFFICIENTLY ENCODED VIDEO FRAMES IN A DISTRIBUTED VIDEO CODING ENVIRONMENT

BACKGROUND

Video conferencing has recently been evolving into the realm of lightweight portable computing devices such as mobile phones and tablet computers. Mobile phones, for example, which only carried voice signals in past years, are now capable of capturing, sending and receiving streams of video frames in real time. Video conferencing between lightweight portable computing devices such as mobile phones and tablet computers is constrained by the limited computational capacity and computational speed of the lightweight devices, by the need to conserve their battery life, and by bandwidth restrictions on networks like 3G and 4G mobile device networks that transmit signals between the lightweight devices. Similar constraints also still apply to larger, more powerful computing devices such as geographically remote computer work stations which conduct video conferencing over high-speed networks. However, the constraints are more pronounced in the world of mobile computing devices.

Rapid, real-time exchange of clear images in video streams passing from one lightweight media device to another requires the sending device to quickly encode information for each sent video frame so that a decoding mechanism can reconstruct an accurate representation of the sent video frame. The encodings for the sequence of video frames must be compact enough that they can flow speedily through the network pipe connecting the sending and receiving devices, yet they must also convey sufficient data to facilitate reconstructing accurate renderings of the sequence of video frames for display on a receiving device. A judicious balance must be struck between the degree of video compression occurring on the sending device and the accuracy of the result, and between the size of the encoding and the speed of its transmission across the network.

SUMMARY

The description herein discloses various embodiments of systems and methods for reconstructing a sequence of video frames received from a sending device, where some of the video frames are key video frames and others of the video frames are non-key video frames, and where at least one pixel block of at least one of the non-key video frames is indicated for reconstruction via a corresponding previous pixel block of a previous video frame, and at least one pixel block of at least one of the non-key video frames is not indicated for reconstruction via the corresponding previous pixel block of the previous video frame. The reconstructing of the sequence of video frames received from the sending device comprises, for each key video frame of the sequence of video frames, reconstructing the key video frame based on decoding an encoding of the key video frame, where the encoding of the key video frame is received from the sending device. The reconstructing of the sequence of video frames received from the sending device further comprises, for each non-key video frame of the sequence of video frames, reconstructing the non-key video frame. The reconstructing of the non-key video frame comprises, for each particular pixel block of one or more pixel blocks of the non-key video frame that is indicated for reconstruction via the corresponding previous pixel block of the previous video frame, reconstructing the particular pixel block of the non-key video frame based on the corresponding previous pixel block of the previous video frame. The reconstructing of the non-key video frame further comprises, for each particular pixel block of one or more pixel blocks of the non-key video frame that is not indicated for reconstruction via the corresponding previous pixel block of the previous video frame, reconstructing the particular pixel block of the non-key video frame based on decoding an encoding of the particular pixel block of the non-key video frame received from the sending device, where the encoding of the particular pixel block is based on contents of the non-key video frame that contains the particular pixel block and not on contents of the previous key video frame, nor on contents of any other video frame positioned between the previous key video frame and the non-key video frame in the sequence of video frames.

In various embodiments, a memory is coupled to one or more processors, and the memory stores program instructions executable by the one or more processors to implement a distributed video coding environment as described herein. In these embodiments, the functions described above may be performed via the distributed video coding environment. In some embodiments, the system may include a non-transitory computer-readable storage medium storing program instructions that are computer-executable to perform these functions.

Figure 1:
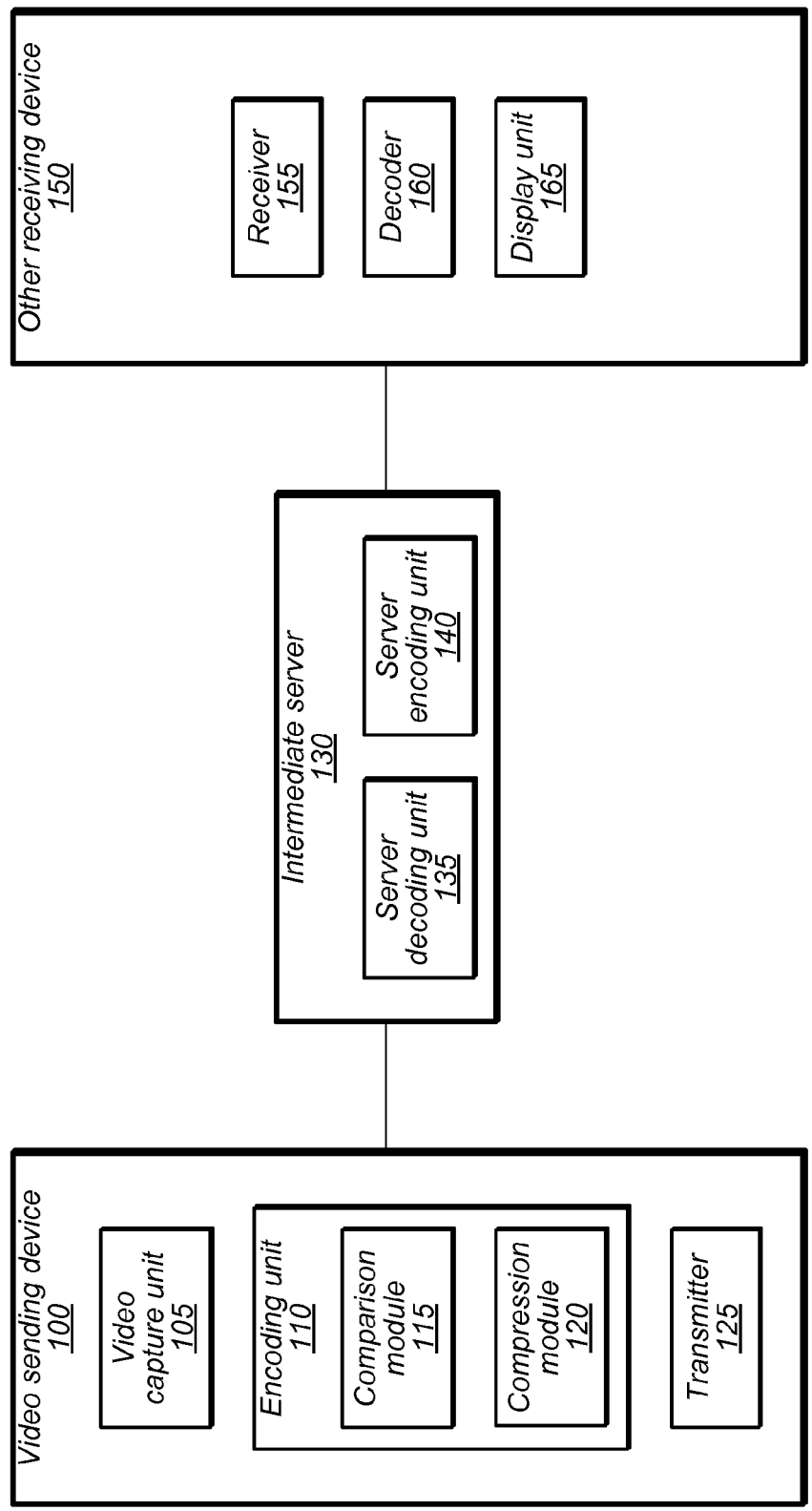
FIG. 1 illustrates one embodiment of system components of a distributed video coding environment.

While the present disclosure is described herein by way of example for several embodiments and illustrative drawings, those skilled in the art will recognize that the disclosure is not limited to the embodiments or drawings described. It should be understood that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

The following discussion explores various embodiments of systems and methods for processing a sequence of video frames in a distributed video coding environment, including the encoding of representations of the video frames that will be sent to a receiving device. The discussion also explores various embodiments of systems and methods for reconstructing representations of the sequence of video frames using their encoded representations received from a sending device.

FIG. 1 illustrates one embodiment of system components of a distributed video coding environment. The system components shown in FIG. 1 may themselves be embodied in numerous ways, as described throughout this document.

According to a particular embodiment that is described in the next several paragraphs, video sending device 100 is a mobile device such as a mobile phone, and intermediate server 130 is both a receiving device and a sending device in the form of a server computer installed at a fixed location. Device 150 is another receiving device which may also be mobile, such as a mobile phone. Intermediate server 130 is linked to video sending device 100 and other receiving device 150 over a mobile device network. Video sending device 100 is a mobile phone capable of capturing video imagery and generating sequences of video frames from the captured visual imagery. It can also process the sequences of video frames for eventual transmission to receiving device 150, which is also a mobile phone capable of displaying sequences of video frames generated at video sending device 100. Intermediate server 130 is a first receiving device that acts as an intermediary between the two mobile phones, receiving encodings representing the sequences of video frames transmitted from video sending device 100, reconstructing the representations of the sequences of video frames via the received encodings, encoding the reconstructed representations, and transmitting them to the other receiving device 150. Receiving device 150 decodes the encodings received from intermediate server 130 and displays the reconstructed representations of the sequences of video frames. According to various embodiments, video sending device 100 may be capable of receiving as well as sending, and device 150 may be capable of sending as well as receiving.

In this particular embodiment, the computational burden involved in encoding and decoding a stream of video frames in real time, while streaming the video frames from video sending device 100 to receiving device 150, may be distributed among the two mobile phones and the intermediate server in order to optimize the efficiency of the streaming process and to maximize the quality of the representations of the original sequence of video frames that will be viewed on the receiving mobile phone. Since both the mobile phone which captures and streams the video imagery, and the mobile phone which receives and displays the streamed imagery, are both lightweight portable devices whose processing power is meager in comparison to the processing power of the intermediate server, the systems and methods described herein shift much of the computational burden onto the intermediate server. The intermediate server reconstructs the video frames being streamed from the mobile phone and sends its own encoding of those video frames to the other mobile phone, which decodes and displays the reconstructed video frames.

In this particular embodiment, the encoding algorithms performed on video sending device 100, which is just a mobile phone, are very efficient and designed to impose only a minimal processing load on video sending device 100, while the decoding and encoding and storage operations performed on intermediate server 130 are more intensive, thus placing the bulk of the computational load on the component best able to carry it. In brief, video sending device 100 fully encodes only a sparse subset of the full set of video frames being streamed to intermediate server 130. Those video frames which are fully encoded by video sending device 100 are called key video frames, and they form a small proper subsequence of the complete sequence of video frames being processed and transmitted by video sending device 100. The remaining video frames, the non-key video frames, receive a different treatment on video sending device 100. For any given non-key video frame, which typically sits between two key video frames in the full sequence, video sending device 100 processes the given non-key video frame as a collection of pixel blocks which, when taken together, make up the entire given non-key video frame. Video sending device 100 processes the pixel blocks serially.

By performing a simple but accurate test, video sending device 100 can decide which of the pixel blocks in the given non-key video frame can be safely replaced with a corresponding pixel block in a previous video frame without significantly affecting the quality of the resulting representation of the given non-key video frame. Video sending device 100 essentially ignores all such pixel blocks, and does not bother to encode them. Instead, video sending device 100 simply leaves it to intermediate server 130, the workhorse of this particular distributed video coding environment, to fetch its own stored copies of those corresponding pixel blocks of previous video frames, which intermediate server 130 has already decoded and stored at an earlier stage of its reconstruction of the sequence of video frames, and to substitute them for the corresponding pixel blocks which video sending device 100 did not bother to encode.

If, on the other hand, the same simple but accurate test performed by video sending device 100 determines that a particular pixel block of the given non-key video frame differs too much from the corresponding pixel block of the previous video frame, then video sending device 100 encodes a representation of just that particular pixel block itself, without reference to other pixel blocks of other video frames. This encoding is specially designed to compress the representation of the particular pixel block into a relatively small set of bits, so that the encoding sent to intermediate server 130 does not require unnecessary bandwidth. The specially-designed encoding can be performed quickly on video sending device 100, while preserving a high-quality representation of the particular pixel block being encoded.

By using the right combination of algorithms, video sending device 100 has the capacity to encode a reasonable representation of the sequence of video frames without expending undue processing resources or transmission bandwidth.

As mentioned above, the embodiment described in the preceding paragraphs is but one of many possible diverse embodiments of the componentry exhibited in FIG. 1. The following paragraphs describe this particular embodiment and many other embodiments in fuller detail.

Efficient Encoding of Video Frames in a Distributed Video Coding Environment

The following paragraphs describe techniques for processing a sequence of video frames and for reconstructing the sequence of video frames using the systems and methods described herein.

Video sending device 100 of FIG. 1 may typically be embodied as a lightweight or portable or mobile computing device such as a mobile phone, a portable media player, a tablet computer, a netbook computer, a web camera, a video camera, a video walkie-talkie, a video handheld transceiver, a personal digital assistant, a handheld video game device, or any other such lightweight or portable or mobile computing device capable of processing sequences of video frames according to the systems and methods described herein. Since the systems and methods described herein may also be performed by equipment having more substantial computing power, or by stationary computing equipment, video sending device 100 may, according to other embodiments, be realized as a laptop or notebook computer, a mainframe computer system, a workstation, a network computer, a combination device, a set top box, a video game console, an application server, a storage device, a peripheral device such as a printer, copy machine, switch, modem, or router, or another type of computing or electronic device.

Video sending device 100 may, in some embodiments, include a video capture unit 105 for capturing visual imagery and generating sequences of video frames from the captured visual imagery. The sequences of video frames generated from the visual imagery captured by video capture unit 105 may then be processed by video sending device 100 to produce encoded representations of the sequences of video frames that will be transmitted to a receiving device by transmitter 125. Video capture unit 105 may be variously embodied as a camera or other video capturing mechanism contained within or operating in conjunction with any of the various embodiments of video sending device 100.

According to certain embodiments, video sending device 100 may not possess a video capture unit 105, but may instead contain one or more stored sequences of video frames, or may, alternatively, acquire one or more sequences of video frames from a separate source. Some embodiments of video sending device 100 may obtain sequences of video frames from one or more external sources via any of various kinds of networks, both wired and wireless. Such networks may include cellular phone or other mobile device networks operating under any of several wireless standards, including 3G and 4G broadband mobile telephony standards. They may also include the global Internet system of computer networks operating under the standard Internet Protocol Suite (TCP/IP), as well as various internal or intranet systems, and wireless local area networks (WLANs), or any combination of such networks.

For some embodiments in which video sending device 100 acquires a sequence of video frames from an external source, video sending device 100 may store the acquired sequence of video frames before processing the acquired sequence of video frames. For other embodiments in which video sending device 100 acquires a sequence of video frames from an external source, video sending device 100 may not store the acquired sequence of video frames before processing the acquired sequence of video frames. For embodiments in which video sending device 100 does contain a video capture unit 105 for capturing visual imagery and generating sequences of video frames from the captured visual imagery, video sending device 100 may or may not store the sequence of video frames generated from the captured visual imagery before processing the sequence of video frames, depending on the particular embodiments. According to certain embodiments, video sending device 100 may process the sequence of video frames as they are being acquired or generated, without first writing them to storage. In particular, video sending device 100 may process the sequence of video frames concurrently with capturing the visual imagery and generating sequences of video frames from the captured visual imagery.

Figure 2:
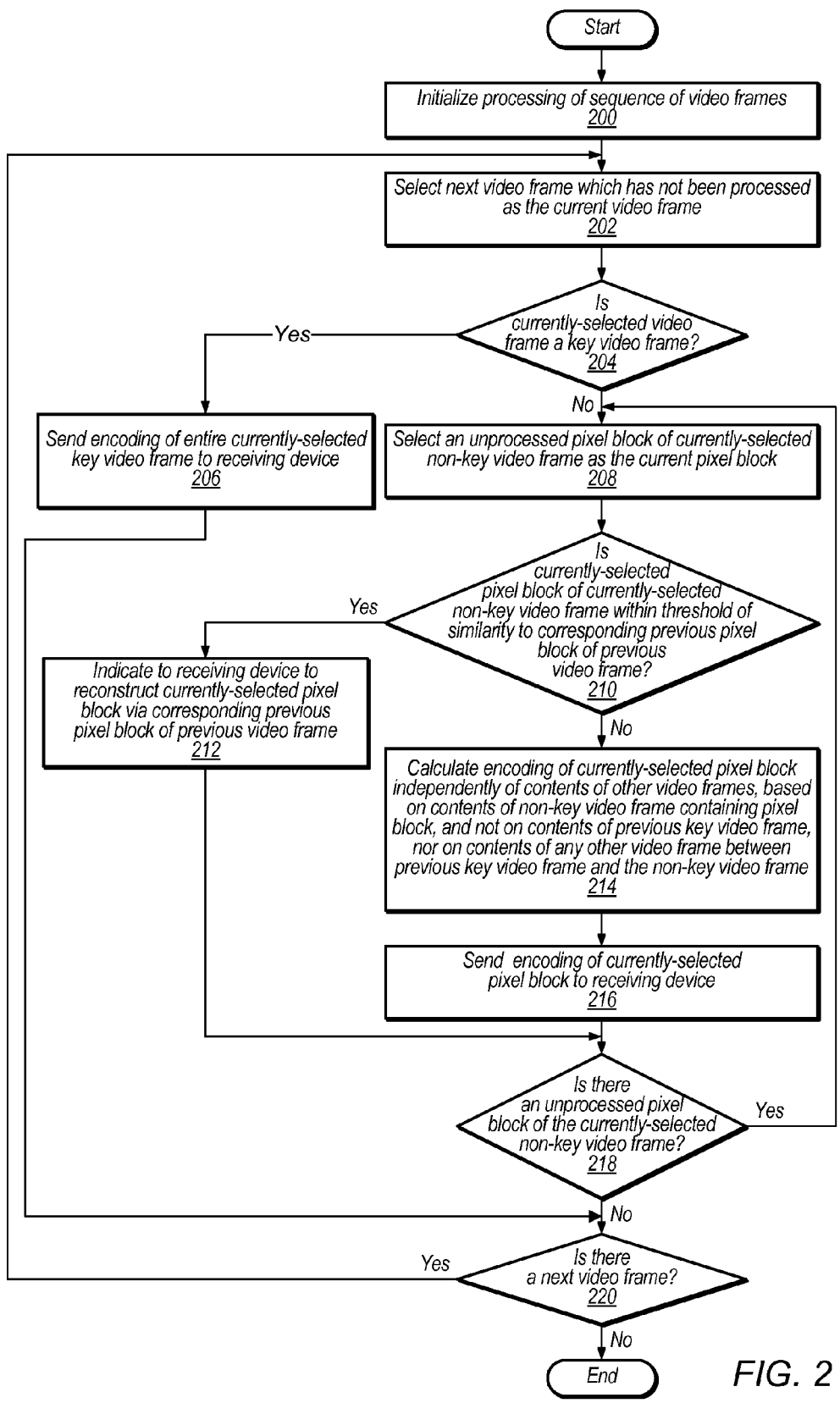
FIG. 2 is a flow diagram illustrating one embodiment of a method for processing a sequence of video frames on a sending device that sends an encoding of the sequence of video frames to a receiving device.

FIG. 2 is a flow diagram illustrating one embodiment of methods for processing a sequence of video frames on a sending device, such as video sending device 100, which sends an encoding of the sequence of video frames to a receiving device while operating in the distributed video coding environment illustrated in FIG. 1. Each of various embodiments of video sending device 100 may contain or operate in conjunction with an encoding unit 110, which may perform a variety of functions involved in processing sequences of video frames. Those functions may vary along with the embodiments of encoding unit 110.

Video sending device 100 may initialize the processing of a sequence of video frames, as indicated at FIG. 2, process block 200. This may include initializing a Group of Pictures (GOP) that consists of a subsequence of the sequence of video frames. See FIG. 3, process block 300. Encoding unit 110 may determine some of the sequence of video frames as key video frames, and other video frames of the sequence of video frames as non-key video frames. This determination may vary from one embodiment to another. For example, one embodiment may designate every eighth video frame as a key video frame, so that the key video frames are indexed within the sequence of video frames as 1, 9, 17, etc. Another embodiment may designate every tenth video frame as a key video frame, so that the key video frames are indexed within the sequence of video frames as 1, 11, 21, etc. Various embodiments may designate any proper subsequence of the sequence of video frames as the collection of key video frames, where the elements of the proper subsequence may or may not occur at regular intervals, depending upon the embodiments. According to some embodiments, selecting video frames for designation as key video frames may depend on analyzing the visual content of the sequence of video frames. For example, if a video frame is found to contain a change in scene, or change in contrast, or some other change or characteristic distinguishing it from previous video frames, or from subsequent video frames, or from some other set of video frames, then that video frame may be selected as a key video frame. Such analysis of the visual content of the video frames in the sequence may be conducted on a real-time basis as the sequence of video frames is being processed and streamed.

Video frames which are not designated as key video frames may be regarded as non-key video frames, and the non-key video frames also form a proper subsequence of the sequence of video frames. According to numerous embodiments, there are fewer key video frames than non-key video frames, so that the collection of key video frames may often contain fewer elements than the collection of non-key video frames, although this is not true for all embodiments. The key video frames may therefore be regarded, in many instances, as forming a sparser subsequence of the sequence of video frames than the subsequence of non-key video frames.

The processing, by encoding unit 110, of each given video frame in the sequence of video frames is based upon whether the given currently-selected video frame is a key video frame or a non-key video frame, as illustrated by decision block 204 of FIG. 2. At process block 202 of FIG. 2, encoding unit 110 selects a next video frame, from among remaining video frames in the sequence of video frames which have not yet been processed by encoding unit 110. The selected video frame is then processed by encoding unit 110 according to a method such as the processing method depicted in FIG. 2. The processing of the video frame currently selected for processing begins at decision block 204 of FIG. 2, where video sending device 100 determines whether the currently-selected video frame is a key video frame or a non-key video frame.

As indicated by process block 206 of FIG. 2, key video frames may be encoded in their entirety, all at once, and without reference to other video frames, and the resulting encoding of the entire currently-selected key video frame may then be sent by transmitter 125 to a receiving device such as intermediate server 130 or receiving device 150.

Non-key video frames, on the other hand, are not generally encoded in their entirety. Instead, the non-key video frames may each be divided or partitioned into sets of pixel blocks, such that each pixel block of a non-key video frame corresponds spatially to a corresponding pixel block in each of the other non-key video frames. In other words, each one of the non-key video frames may be subdivided into a set of pixel blocks according to the same numeric or geometric pattern, such that each pixel block specified by the numeric or geometric pattern in a given non-key video frame matches a corresponding pixel block specified in each of the other non-key video frames by the same numeric or geometric pattern. See process block 304 of FIG. 3. For example, according to some embodiments, each non-key video frame may be subdivided into pixel blocks that each measure 16-by-16 pixels. This subdivision may be explicitly applied geometrically to a complete matrix of pixel values for each non-key video frame, or may it be more implicitly applied by stripping off 256-pixel blocks from the individual sequences of pixels that each represent one of the non-key video frames.

Figure 3:
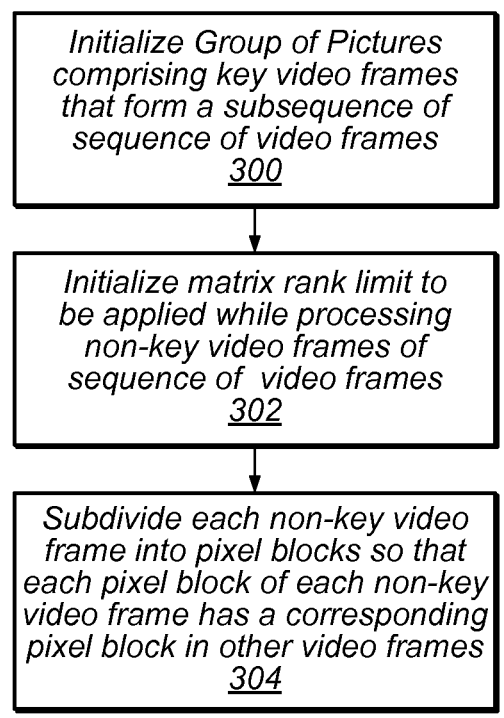
FIG. 3 is a flow diagram illustrating one embodiment of a method for initializing the processing of a sequence of video frames on a sending device that sends an encoding of the sequence of video frames to a receiving device.

The subdivision of the non-key video frames into sets of pixel blocks indicated by block 304 of FIG. 3 may occur at different stages of the processing of the sequence of video frames, depending upon the various embodiments. For example, according to some embodiments, the subdivision of the non-key video frames into sets of pixel blocks may occur on a real-time basis for each individual non-key video frame as the non-key video frame is being processed. According to other embodiments, non-key video frames may be subdivided into sets of pixel blocks in advance of further processing. For instance, a set of consecutive non-key video frames may each be subdivided into corresponding pixel blocks in advance of the processing of any members of that set of consecutive non-key video frames. The function indicated at process block 304 of FIG. 3 may therefore be performed either as part of a preliminary initialization of the processing of the sequence of video frames, as indicated at process block 200, or at a later stage.

As mentioned above, unlike the key video frames, non-key video frames are not generally encoded all at once in their entirety. Instead, video sending device 100 may serially process each pixel block in the collection of pixel blocks that make up the non-key video frame currently selected for processing. At process block 208 of FIG. 2, video sending device 100 selects one unprocessed pixel block as the particular pixel block scheduled for current processing. The unprocessed pixel block is chosen from among the pixel blocks that collectively form the currently-selected non-key video frame. Comparison module 115 of encoding unit 110 then determines, at decision block 210 of FIG. 2, whether that particular currently-selected pixel block of the currently-selected non-key video frame is within a threshold of similarity to a corresponding previous pixel block of a previous video frame in the sequence of video frames. The previous pixel block may be either another non-key video frame or a key video frame, depending upon the position of the particular pixel block within the entire sequence of video frames. If the particular pixel block of the currently-selected non-key video frame is determined by comparison module 115 to be within the threshold of similarity to a corresponding previous pixel block, then encoding unit 110 may not bother to encode that particular pixel block of the currently-selected non-key video frame. Instead, as indicated at process block 212 of FIG. 2, in response to the determination made at decision block 210 of FIG. 2, transmitter 125 of video sending device 100 may simply indicate to a receiving device that the receiving device may reconstruct this particular currently-selected pixel block of the currently-selected non-key video frame via a corresponding previous pixel block of a previous video frame. In other words, the receiving device may simply use the reconstructed representation of the corresponding previous pixel block of the previous video frame as the reconstructed representation of this particular pixel block of the currently-selected non-key video frame. This indication to the receiving device may be efficiently signaled by transmission of a single bit by transmitter 125, according to some embodiments.

According to some other embodiments, this indication to the receiving device may only be implicitly delivered to the receiving device, without any explicit transmission regarding the particular pixel block. For example, the receiving device may interpret the absence of any sent encoding of the particular pixel block of the currently-selected non-key video frame as an implicit indication to reconstruct the particular pixel block of the currently-selected non-key video frame via the corresponding pixel block of the previous video frame that has been determined, by comparison module 115, to be within a threshold of similarity to the particular pixel block.

In the alternative, in response to a determination made at decision block 210 of FIG. 2 by comparison module 115 of encoding unit 110 that the currently-selected pixel block of the currently-selected non-key video frame is not within the threshold of similarity to a corresponding pixel block of a previous video frame, compression module 120 of encoding unit 110 may calculate an encoding of the currently-selected pixel block of the currently-selected non-key video frame, where the calculation of the encoding is based on contents of the currently-selected non-key video frame that contains the currently-selected pixel block, and not on contents of the immediately-previous key video frame, nor on contents of any other video frame positioned, within the sequence of video frames, between the immediately-previous key video frame and the currently-selected non-key video frame. See process block 214 of FIG. 2. For some embodiments, compression module 120 encodes the visual content of the currently-selected pixel block of the currently-selected non-key video frame based only on the visual contents of the currently-selected non-key video frame containing the currently-selected pixel block, without regard to the visual content of any other video frame of the sequence of video frames. Since the visual content of the currently-selected pixel block has been determined to be substantially different from the visual content of the corresponding pixel block in the previous video frame, in the sense that the visual content of the currently-selected pixel block is not within the threshold of similarity to the corresponding pixel block of the previous video frame, video sending device 100 allocates enough resources to encode at least the visual content of the currently-selected pixel block itself.

By encoding just the visual contents of those pixel blocks of the currently-selected non-key video frame that are not within the threshold of similarity to the visual contents of a corresponding pixel block in a previous video frame, video sending device 100 may limit and control the expenditure of its own computational resources to encode an adequate representation of the currently-selected non-key video frame, and may also limit and control the number of bits required for transmitting an adequate representation of the currently-selected non-key video frame. Video sending device 100 expends both its own processing resources and transmission bandwidth resources only for those pixel blocks of the currently-selected non-key video frame whose visual contents are deemed to be substantially different from the visual contents of the corresponding pixel block in a previous video frame. In this way, video sending device 100 can create and send to the receiving device, via transmitter 125, block encodings which adequately capture just the pixel blocks of the currently-selected non-key video frame that are judged by comparison module 115 to be substantially different from the visual contents of corresponding pixel blocks of previous video frames. See process block 216 of FIG. 2.

The burden of representing a pixel block of a currently-selected non-key video frame which video sending device 100 decides not encode is placed upon the receiving device. As indicated at process block 212 of FIG. 2, the receiving device is instructed by video sending device 100, either explicitly or implicitly, to reconstruct a representation of such a currently-selected pixel block using a corresponding pixel block of a previous video frame, which the receiving device will have already reconstructed. In other words, as indicated by decision block 210 of FIG. 2, video sending device 100 is only concerned with providing an encoded representation to the receiving device of those pixel blocks whose visual contents have been determined to be substantially different from the visual contents of corresponding pixel blocks of previous video frames. Since the receiving device will already possess a reconstruction representing the visual contents of previous video frames, it can use a pixel block of a previous video frame which is within the threshold of similarity to the currently-selected pixel block of the currently-selected non-key video frame as a representation of the currently-selected pixel block of the currently-selected non-key video frame.

At decision block 218 of FIG. 2, video sending device 100 checks to see if there remains an unprocessed pixel block of the currently-selected non-key video frame. If such an unprocessed pixel block does remain, the processing of the currently-selected non-key video frame resumes at process block 208 of FIG. 2. If there are no more unprocessed pixel blocks of the currently-selected non-key video frame, then processing of the sequence of video frames continues at decision block 220 of FIG. 2, where video sending device 100 checks to see if there is a next video frame waiting to be processed. If so, then processing of the sequence of video frames resumes at process block 202 of FIG. 2. If there are no more video frames waiting to be processed, then processing terminates.

The determination by comparison module 115 as to whether each particular pixel block of a given non-key video frame is within a threshold of similarity to a corresponding previous pixel block of a previous video frame in the sequence of video frames may be calibrated to balance the quality of the reconstruction of the sequence of video frames at the sending device against the expenditure of computer processing resources, bandwidth usage, and speed. Various judicious embodiments of comparison module 115 may be implemented so that the determination of the degree of similarity between a particular pixel block of a given non-key video frame and a matching pixel block of a previous video frame is efficient in the use of computer processing resources on video sending device 100, and accurate in assessing the degree to which the particular pixel block of the given non-key video frame may be visually perceived by the human eye as similar to a matching pixel block of a previous video frame. Accuracy in assessing this degree of similarity permits conserving computer processing resources and transmission bandwidth resources while still achieving adequate quality in the eventual rendering, at a receiving device, of the original sequence of video frames processed at video sending device 100.

Aside from video sending device 100, FIG. 1 also illustrates a receiving/sending device in the form of an intermediate server 130, as well as another receiving device 150. According to some embodiments, server 130 and other receiving device 150 are separate, geographically remote machines. For some such embodiments, intermediate server 130 may function to relieve video sending device 100 and receiving device 150 of a substantial portion of the computational burden involved in sending and receiving streams of video frames. Especially in embodiments in which video sending device 100 and other receiving device 150 are lightweight or portable or mobile computing devices such as a mobile phone, a portable media player, a tablet computer, a netbook computer, a web camera, a video camera, a video walkie-talkie, a video handheld transceiver, a personal digital assistant, or a handheld video game device, the computational burden of sending and receiving streams of video frames may be shifted away from video sending device 100 and other receiving device 150 onto intermediate server 130, a receiving and sending device which may sometimes be embodied as a fixed computing machine have greater computing power and storage capability than either video sending device 100 or other receiving device 150. By concentrating the computational activity at such an intermediate server 130, the systems and methods described herein may also reduce the bit load necessary to carry information sent by video sending device 100, and may also reduce the bit load necessary to carry information received by other receiving device 150, that is, they may lower the overall bandwidth used in sending streams of video frames from video sending device 100 to receiving device 150.

For such embodiments where intermediate server 130 is both a receiving and a sending device separate from the other receiving device 150, intermediate server 130 may function both to receive an encoding of a sequence of video frames transmitted to it from video sending device 100 by transmitter 125, and to send encodings of reconstructions of the video frames to the other receiving device 150. Intermediate server 130 may reconstruct the sequence of video frames from encodings of representations of the video frames received from video sending device 100. Some video frames of the sequence of video frames are key video frames, while others are non-key video frames, as described above. At least one pixel block of at least one of the non-key video frames is indicated by video sending device 100 for reconstruction, at intermediate server 130, via a corresponding previous pixel block of a previous video frame. In addition, at least one pixel block of at least one of the non-key video frames is not indicated for reconstruction via a corresponding pixel block of a previous video frame. As discussed before, transmitter 125 of video sending device 100 may, for some embodiments, transmit an explicit indication to intermediate server 130 to reconstruct a pixel block of a non-key video frame via a corresponding previous pixel block of a previous video frame. For some other embodiments, such an indication may only be made implicitly. For example, video sending device 100 may omit sending any information about a given pixel block of a non-key video frame, and intermediate server 130 may determine, based on this omission, that the given pixel block of the non-key video frame should be reconstructed, on server 130, from a corresponding previous pixel block of a previous video frame.

Figure 6:
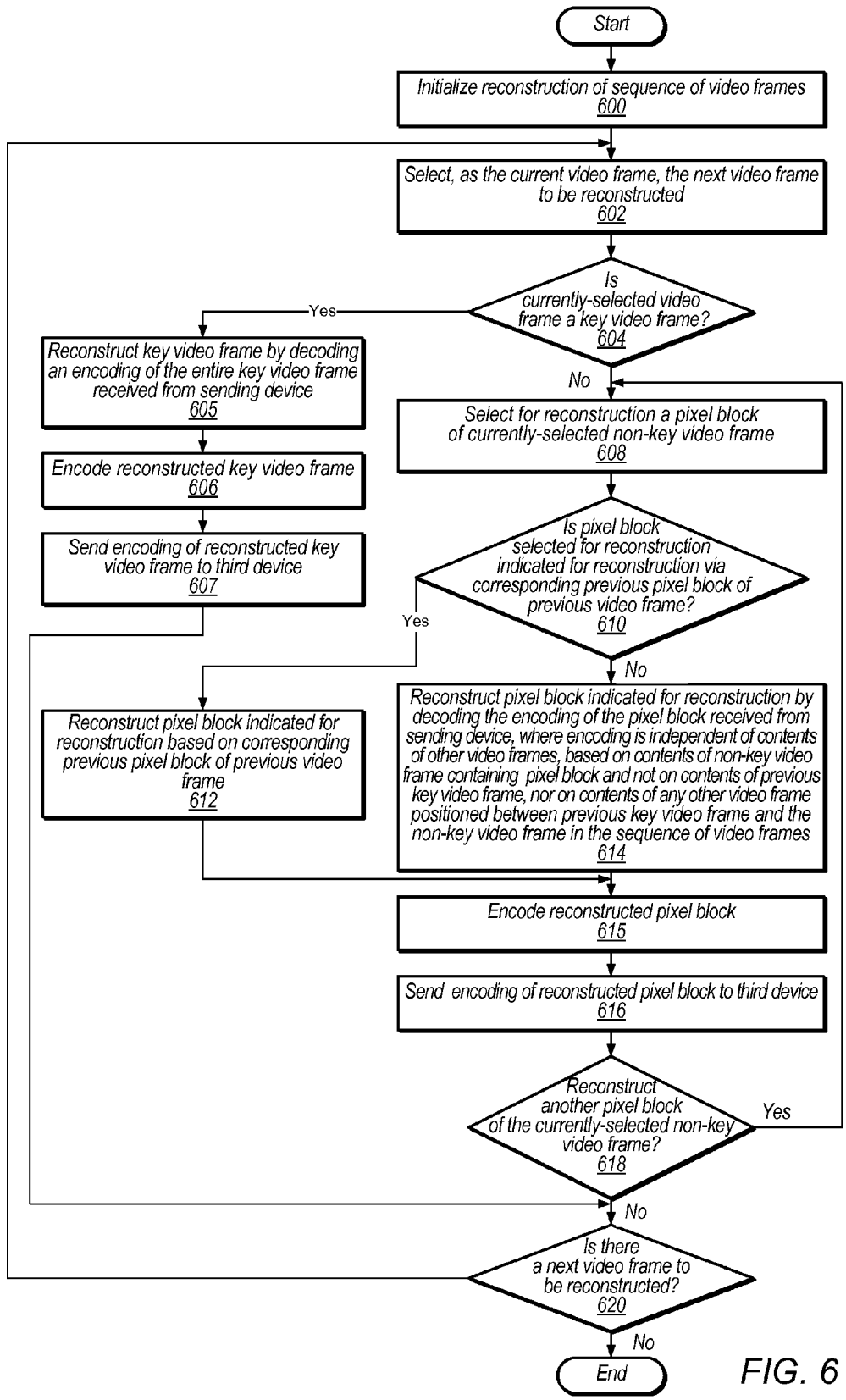
FIG. 6 is a flow diagram illustrating one embodiment of a method for reconstructing a sequence of video frames on a device which receives an encoding of the sequence of video frames from a sending device.

Intermediate server 130 may initialize the reconstruction of a representation of each video frame of the sequence of video frames, as indicated at process block 600 of FIG. 6. The reconstruction may be based on a decoding, performed by server decoding unit 135, of an encoding of the sequence of video frames received from video sending device 100.

The reconstructing of a representation of each video frame of the sequence of video frames may be performed, for each given video frame, according to whether the given video frame is a key video frame or a non-key video frame, as illustrated by decision block 604 of FIG. 6. At process block 602 of FIG. 6, intermediate server 130 may select, as the current video frame, the next video frame to be reconstructed by intermediate server 130. The currently-selected video frame may then be reconstructed by intermediate server 130 according to a method such as the one depicted in FIG. 6. The reconstruction of the currently-selected video frame begins at decision block 604 of FIG. 6, where intermediate server 130 determines whether the currently-selected video frame is a key video frame or a non-key video frame.

As indicated by process block 605 of FIG. 6, if the currently-selected video frame is a key video frame, then it may be reconstructed on intermediate server 130 based on simply decoding an encoding of the entire key video frame sent by transmitter 125 and received by intermediate server 130. The coding methods used by encoding unit 110 of video sending device 100 to encode whole key video frames may vary along with the embodiments, and so the type of decoding performed by server decoding unit 135 matches the type of encoding performed by encoding unit 110. An encoding of the entirety of each key video frame is sent by transmitter 125 to intermediate server 130.

The reconstruction of a key video frame at intermediate server 130, based on a decoding, by server decoding unit 135, of an encoding of the key video frame produced by encoding unit 110, may result in either an exact reconstruction of the original key video frame, or in an approximation to the original key video frame. The resulting reconstruction depends on whether the encoding generated by encoding unit 110 preserves an exact copy of the original key video frame or, alternatively, contains only an approximation to the original key video frame.

If the video frame being reconstructed on intermediate server 130 is a non-key video frame, then the non-key video frame may be reconstructed on intermediate server 130 by individually reconstructing each of one or more pixel blocks that form a partition of the non-key video frame. The reconstruction of each individual pixel block of the one or more pixel blocks that form a partition of the non-key video frame depends on whether or not the individual pixel block is indicated for reconstruction via a corresponding pixel block of a previous video frame.

If it is determined, at decision block 604, that the currently-selected video frame is not a key video frame, then intermediate server 130 selects a pixel block of the currently-selected non-key video frame for reconstruction, as illustrated at process block 608 of FIG. 6.

At decision block 610 of FIG. 6, intermediate server 130 determines whether the pixel block currently selected for reconstruction on intermediate server 130 is indicated for reconstruction via a corresponding pixel block of a previous video frame. If so, then as illustrated at process block 612 of FIG. 6, intermediate server 130 may simply use its existing reconstruction of a corresponding pixel block of a previous video frame as a viable reconstruction of the pixel block currently selected for reconstruction. That is, intermediate server 130 may substitute an existing reconstruction of a corresponding pixel block of a previous video frame for the pixel block currently selected for reconstruction. In this manner, the effort expended to facilitate the generation of the currently-selected pixel block on intermediate server 130 is greatly reduced, based on the currently-selected pixel block's similarity to a corresponding pixel block of a previous video frame.

However, if the currently-selected pixel block of the one or more pixel blocks that partition the currently-selected non-key video frame is not indicated for reconstruction on intermediate server 130 via a corresponding pixel block of a previous video frame, then, as illustrated at process block 614 of FIG. 6, reconstructing the currently-selected pixel block on intermediate server 130 may be based on a decoding, by server decoding unit 135, of an encoding of the currently-selected pixel block of the currently-selected non-key video frame received from video sending device 100. The encoding of the currently-selected pixel block received from video sending device 100 is based on contents of the currently-selected non-key video frame that contains the currently-selected pixel block, and not on contents of the immediately previous key video frame, nor on contents of any other video frame positioned, within the sequence of video frames, between the immediately previous key video frame and the currently-selected non-key video frame. For some embodiments, the encoding of the visual content of the currently-selected pixel block of the currently-selected non-key video frame received at intermediate server 130 from video sending device 100 is based only on the visual contents of the currently-selected non-key video frame that contains the currently-selected pixel block, without regard to the visual content of any other video frame of the sequence of video frames.

After server decoding unit 135 has reconstructed each key video frame, server encoding unit 140 may then encode each reconstructed key video frame, as illustrated at process block 606 of FIG. 6. The encoding of each reconstructed key video frame is then sent from intermediate server 130 to another receiving device 150, a third device which is separate from both video sending device 100 and from intermediate server 130, as shown at process block 607 of FIG. 6.

After server decoding unit 135 has reconstructed a pixel block of a non-key video frame, server encoding unit 140 may then encode the reconstructed pixel block, as illustrated at process block 615 of FIG. 6. At process block 616 of FIG. 6, intermediate server 130 sends the encoding of the reconstructed pixel block to another receiving device 150, a third device which is separate from both video sending device 100 and from intermediate server 130.

Thus, as the encodings of the various key and non-key video frames are decoded by server decoding unit 135, and the video frames are successively reconstructed, server encoding unit 140 may encode the reconstructed sequence of video frames, and intermediate server 130 may send the resulting encoding of the reconstructed sequence of video frames to another receiving device 150, a third device which is separate from both video sending device 100 and from intermediate server 130.

At decision block 618, intermediate server 130 determines whether there is another pixel block of the currently-selected non-key video frame which needs to be reconstructed. If so, the reconstruction of the currently-selected non-key video frame resumes at process block 608 of FIG. 6, where intermediate server 130 selects another pixel block of the currently-selected non-key video frame for reconstruction. If there are no more pixel blocks of the currently-selected non-key video frame which need to be reconstructed, then the process of reconstructing the sequence of video frames resumes at decision block 620 of FIG. 6. The process of reconstructing the sequence of video frames may also reach decision block 620 immediately after the encoding of a reconstructed key video frame is sent to a third device, as indicated at process block 607 of FIG. 6.

At decision block 620, intermediate server 130 determines whether there is another video frame waiting to be reconstructed. If so, reconstruction of the sequence of video frames resumes at processing block 602 with the selection of such a video frame as the current video frame that will be reconstructed next. If not, the reconstruction of the sequence of video frames is finished.

According to some embodiments, intermediate server 130 may send an encoding for each reconstructed video frame as soon as server encoding unit 140 completes the encoding for each reconstructed video frame, in order to provide a stream of individual full-frame encodings. For some other embodiments, intermediate server 130 may partition the transmission of the entire sequence of reconstructed video frames more finely or more coarsely, according to various schemes. For example, intermediate server 130 may elect to stream encodings of fractional portions of the reconstructed video frames, breaking the sent representation of the reconstructed sequence of video frames into small chunks, where the size of the chunks is calibrated according to the capability of receiving device 150. In other instances, intermediate server 130 may break the sent representation of the reconstructed sequence of video frames into larger chunks that each encode several of the reconstructed video frames, where the size of the chunks may again be calibrated according to the capability of the other receiving device 150.

Intermediate server 130 may be embodied in different ways. For example, server 130 may be variously embodied in a laptop or notebook computer, a mainframe computer system, a workstation, a network computer, a set top box, a relay station, a cell tower, a video game console, an application server, a storage device, a switch, a router, or another type of computing or electronic device.

FIG. 1 includes an illustration of receiving device 150, whose receiver 155 may receive the encoded reconstructions representing the original sequences of video frames. Decoder 160 of receiving device 150 may decode the encoding of the reconstructed sequence of video frames produced by server encoding unit 140 and received from intermediate server 130. Display unit 165 may display the reconstructed sequence of video frames on receiving device 150. Like video sending device 100, receiving device 150 may be variously embodied as a lightweight or portable or mobile computing device such as a mobile phone, a portable media player, a tablet computer, a netbook computer, a video walkie-talkie, a video handheld transceiver, a personal digital assistant, a handheld video game device, or any other such lightweight or portable or mobile computing device capable of receiving encoded sequences of video frames and displaying them according to the systems and methods described herein. Since the systems and methods described herein may also be performed by equipment having more substantial computing power, or by stationary computing equipment, receiving device 150 may, according to other embodiments, be realized as a laptop or notebook computer, a mainframe computer system, a workstation, a network computer, a combination device, a video game console, or another type of computing or electronic device.

For many typical embodiments, the decoding performed by receiving device 150 is computationally far less complex and demanding than the encoding operations performed by video sending device 100 and intermediate server 130. For such embodiments, the bulk of the computational load in moving a displayable representation of the original sequence of video frames onto receiving device 150 rests on video sending device 100 and intermediate server 130.

According to some other embodiments, video sending device 100 may send the output of encoding unit 110 directly to receiving device 150, without sending the output to an intermediate server 130. For these embodiments, receiving device 150 may perform the decoding functions that are performed for other embodiments by intermediate server 130. For such embodiments without an intermediate server 130, receiving device 150 may typically not be embodied as a lightweight or portable or mobile computing device, as described earlier, but rather as a more powerful electronic component such as a laptop or notebook computer, a mainframe computer system, a workstation, a network computer, a video game console, or another type of computing device. For such embodiments, receiving device 150 alone may perform the essential functions provided by intermediate server 130 for systems where video sending device 100, intermediate server 130, and receiving device 150 are three separate machines.

As described above, process block 210 of FIG. 2 indicates making a determination as to whether a currently-selected pixel block of a currently-selected non-key video frame is within a threshold of similarity to a corresponding pixel block of a previous video frame. This determination is aimed at deciding whether the visual content of the currently-selected pixel block is similar enough to the visual content of a corresponding pixel block of a previous video frame so that the visual content of the corresponding pixel block of the previous video frame may serve as an adequate approximation to the visual content of the currently-selected pixel frame.

According to the embodiment shown in FIG. 2, the visual content of each pixel block of each non-key video frame is compared to the visual content of a corresponding pixel block of another video frame. It is important that the method chosen for making the comparisons be efficient, and that the comparisons be effective as a real measure of visual similarity, so that pixel blocks judged as similar may be substituted for each other without significantly degrading the visual rendering of the sequence of pixel frames displayed at receiving device 150, and so that there is no unnecessary expenditure of computer resources to encode a pixel block whose visual contents have been judged as dissimilar to the visual contents of a corresponding pixel block in a previous pixel block.

The means for making the determination indicated at process block 210 of FIG. 2 may vary according to diverse embodiments. One particularly effective method for comparing the visual content of one pixel block of one video frame with the visual content of a corresponding pixel block of another video frame is based on comparing a spatial histogram (spatiogram) of the one pixel block with a spatiogram of the other pixel block.

Unlike a traditional histogram of a pixel block, a spatiogram of a pixel block does not ignore all the spatial information contained in the pixel block. Beyond simply accumulating bin counts of various pixel values for a pixel block, a spatial histogram of the pixel block also spatially weights each bin according to the mean and covariance of the pixel locations being counted in that bin. The spatiogram is essentially a histogram having higher-order moments. Like a histogram, a spatiogram can be quickly and efficiently computed, and spatiograms for corresponding pixel blocks can be compared without calculating geometric transformations between the pixel blocks. Since they retain some geometric information, and since they can be efficiently computed and compared, spatiograms provide a method for comparing pixel blocks that is robust and efficient. Experiments show that spatiograms are very effective, especially when compared to ordinary histograms, in determining the degree of perceptible visual similarity of two pixel blocks.

Figure 4:
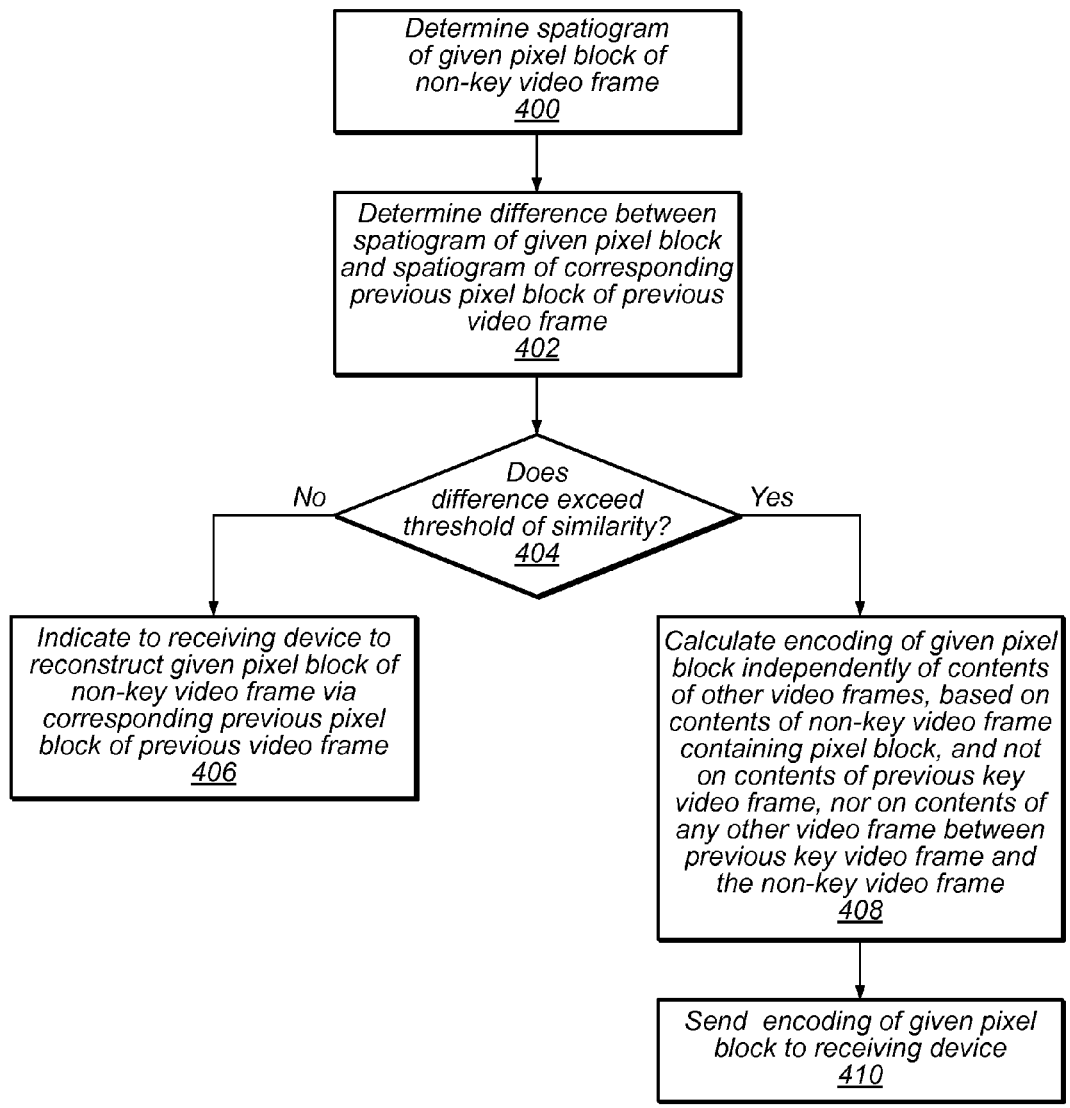
FIG. 4 is a flow diagram illustrating one embodiment of a method for determining whether a given pixel block of a non-key video frame of a sequence of video frames is within a threshold of similarity to a corresponding previous pixel block of a previous video frame in the sequence of video frames.

FIG. 4 is a flow diagram illustrating one embodiment of a method for determining whether a given pixel block of a non-key video frame of a sequence of video frames is within a threshold of similarity to a corresponding previous pixel block of the previous video frame in the sequence of video frames. At process block 400, comparison module 115 of encoding unit 110 determines a spatiogram of the currently-selected pixel block of the currently-selected non-key video frame. At process block 402, a difference is determined between the spatiogram of the currently-selected pixel block of the currently-selected non-key video frame and a spatiogram of the corresponding pixel block of a previous video frame.

At decision block 404, comparison module 115 determines whether the difference exceeds an established threshold of similarity. According to some embodiments, the threshold of similarity may be fixed throughout the processing of the sequence of video frames by video sending device 100. According to some other embodiments, the threshold of similarity may be altered during the processing of the sequence of video frames based upon criteria which may themselves vary according to different embodiments. For example, the threshold of similarity may be increased to increase the number of pixel blocks judged as being similar to each other, so that fewer pixel blocks of non-key video frames require encoding at video sending device 100. Such an increase in the threshold of similarity may speed up the processing of video frames on video sending device 100, resulting in more rapid throughput. In a similar manner, the threshold of similarity may be decreased to decrease the number of pixel blocks judged as being similar to each other, so that more pixel blocks of non-key video frames are encoded at video sending device 100. Such a decrease in the threshold of similarity may produce a more accurate rendering of the sequence of video frames on a receiving device like receiving device 150. According to still other embodiments, the threshold of similarity may be vary based on an ongoing analysis of the sequence of video frames being generated at video sending device 100, in order to balance efficiency in processing the sequence of video frames against accuracy in rendering them at a receiving device. In some instances, the ongoing adjustments to the threshold of similarity may be fully automated, while for other embodiments, the threshold may be manually adjusted by a user of video sending device 100 or of receiving device 150.

As indicated at process block 406 of FIG. 4, if comparison module 115 determines that the difference between the spatiogram of the given pixel block and the spatiogram of the corresponding pixel block of the previous video frame does not exceed the threshold of similarity, then video sending device 100 indicates to a receiving device such as intermediate server 130 or receiving device 150 that the receiving device should reconstruct the given, currently-selected pixel block of the currently-selected non-key video frame via the corresponding pixel block of the previous video frame, as described earlier.

On the other hand, as explained in the foregoing paragraphs, and as indicated at process block 408 of FIG. 4, if comparison module 115 determines that the difference between the spatiogram of the given pixel block and the spatiogram of the corresponding pixel block of the previous video frame does exceed the threshold of similarity, then video sending device 100 calculates an encoding of the given, currently-selected pixel block independently of contents of other video frames, based on contents of the currently-selected non-key video frame containing the given pixel block, and not on contents of the immediately-previous key video frame, nor on contents of any other video frame positioned, within the sequence of video frames, between the immediately-previous key video frame and the currently-selected non-key video frame.

At process block 410 of FIG. 4, video sending device 100 sends the calculated encoding of the given, currently-selected pixel block to a receiving device such as intermediate server 130 or receiving device 150.

As explained above, as illustrated at process block 214 of FIG. 2, compression module 120 of encoding unit 110 of video sending device 100 may calculate an encoding of the currently-selected pixel block of the currently-selected non-key video frame, where the calculation of the encoding is based on contents of the currently-selected non-key video frame that contains the currently-selected pixel block, and not on contents of the immediately-previous key video frame, nor on contents of any other video frame positioned, within the sequence of video frames, between the immediately-previous key video frame and the currently-selected non-key video frame. Given the limited processing power of video sending device 100, and limits on the transmission bandwidth available to video sending device 100, it is important that the technique chosen for compressing the pixel block be computationally efficient, that the result of the compression be small enough that it can be efficiently transmitted to the receiving device, and that the encoding itself represent at least a good approximation, if not an exact representation, of the pixel block and its pixel values. The compression technique chosen for the method illustrated in FIG. 2 may not be burdened with calculations involving any other video frame besides the given, currently-selected video frame.

A variety of compression techniques may be applied in calculating the encoding of the currently-selected pixel block of the currently-selected non-key video frame, according to a variety of embodiments. A particularly judicious compression method, used in some implementations, encodes the currently-selected pixel block of a non-key video frame based on a singular value decomposition of the matrix of pixel values for the currently-selected pixel block.

Singular value decomposition (SVD) of a matrix A factors the matrix A into a product of three matrices, where the left and right factors are orthogonal matrices, and the middle factor $\Sigma$ is a diagonal matrix. A singular value decomposition of A can be derived so that the numbers on the diagonal of $\Sigma$ appear in a non-increasing sequence, from top-left to bottom-right, of non-negative numbers. The positive values on the diagonal matrix $\Sigma$ are the singular values of A. The rank of the matrix A is the same as the number of positive entries on the diagonal of $\Sigma$.

Based on such a singular value decomposition, the matrix A can be very conveniently expressed as a sum of terms of the form $\sigma u v^T$, where $\sigma$ is one of the singular values of A, u is column vector of the left orthogonal matrix in the decomposition of A, and $v^T$ is a row vector taken from the transpose of the right orthogonal matrix in the decomposition of A. In other words, A can be expressed as $\Sigma \sigma_i u_i v_i^T$, where the sum is taken over all the non-zero values of $\Sigma$. Since the rank of the matrix A is the same as the number of non-zero entries on the diagonal of $\Sigma$, that is, the same as the number of non-zero singular values of A, the number of terms appearing in the sum is the same as the rank of A. The smaller the rank of A, the smaller the number of terms appearing in the expression of A as $\Sigma \sigma_i u_i v_i^T$, and the greater the space savings achieved by expressing the matrix A as $\Sigma \sigma_i u_i v_i^T$ instead of the full matrix of pixel values of A.

Thus, if the matrix A has small rank, then it can be quite compactly stored as the sum $\Sigma \sigma_i u_i v_i^T$ obtained in the singular value decomposition of A, in essence allowing compression module 120 of encoding unit 110 to achieve an exact, yet highly-compressed representation of A. However, the rank of A will vary along with the instances of A itself, which is embodied as the matrix of pixel values for the currently-selected pixel block. Among all the non-key video frames of the sequence of video frames being processed on video sending device 100, there may be a large collection of pixel blocks that are selected for encoding on video sending device 100, and so the rank of their corresponding matrices may vary anywhere from being highly rank deficient to having full rank.

For instances in which the matrix A is realized as a full-rank or near-full-rank array, it may be necessary to encode an approximation of A rather than an exact representation of A in order to achieve a sufficient degree of compression when representing A as a sum $\Sigma \sigma_i u_i v_i^T$ obtained via singular value decomposition of A. The nature of singular value decomposition answers this necessity nicely. Singular value decomposition explicitly exposes the fundamental structure of a matrix A, and yields immediate, explicit, compact expressions for matrices having lesser rank than A that serve as excellent approximations to A. In fact, singular value decomposition of A furnishes a ready means to produce an approximation to A having any desired arbitrary rank that is less than the rank of A.

In particular, given a positive integer r which is less than the integer rank(A), and letting k denote the positive integer rank(A)−r, the k smallest singular values of A can be discarded to yield a representation of a matrix of rank r, expressible as $\Sigma \sigma_i u_i v_i^T$, where the sum is taken over the r largest singular values of A. The resulting matrix of rank r, obtained by truncating the full summation, is a best approximation to A according to various norms such as the Euclidean and Frobenius norms. See, for example, the Eckart-Young theorem. Moreover, the truncated r-term sum $\Sigma \sigma_i u_i v_i^T$ representing the matrix that approximates A requires less storage than the corresponding sum of rank(A) terms that is an exact representation of the original matrix A.

This discarding of the smallest k singular values of A to generate a rank-r matrix approximation to A preserves a best-possible approximation of A. Empirical evidence shows that such a reduced-rank approximation to a matrix of pixel values for a pixel array yields a result which is visually superior to the results given by many other types of compression. And, for cases in which the k discarded singular values are relatively small in comparison to the larger singular values that are kept, the resulting approximation may be quite close to A, yielding a representation of the pixel block represented by A that appears to the observer as being visually very similar to the original pixel block.

Figure 5:
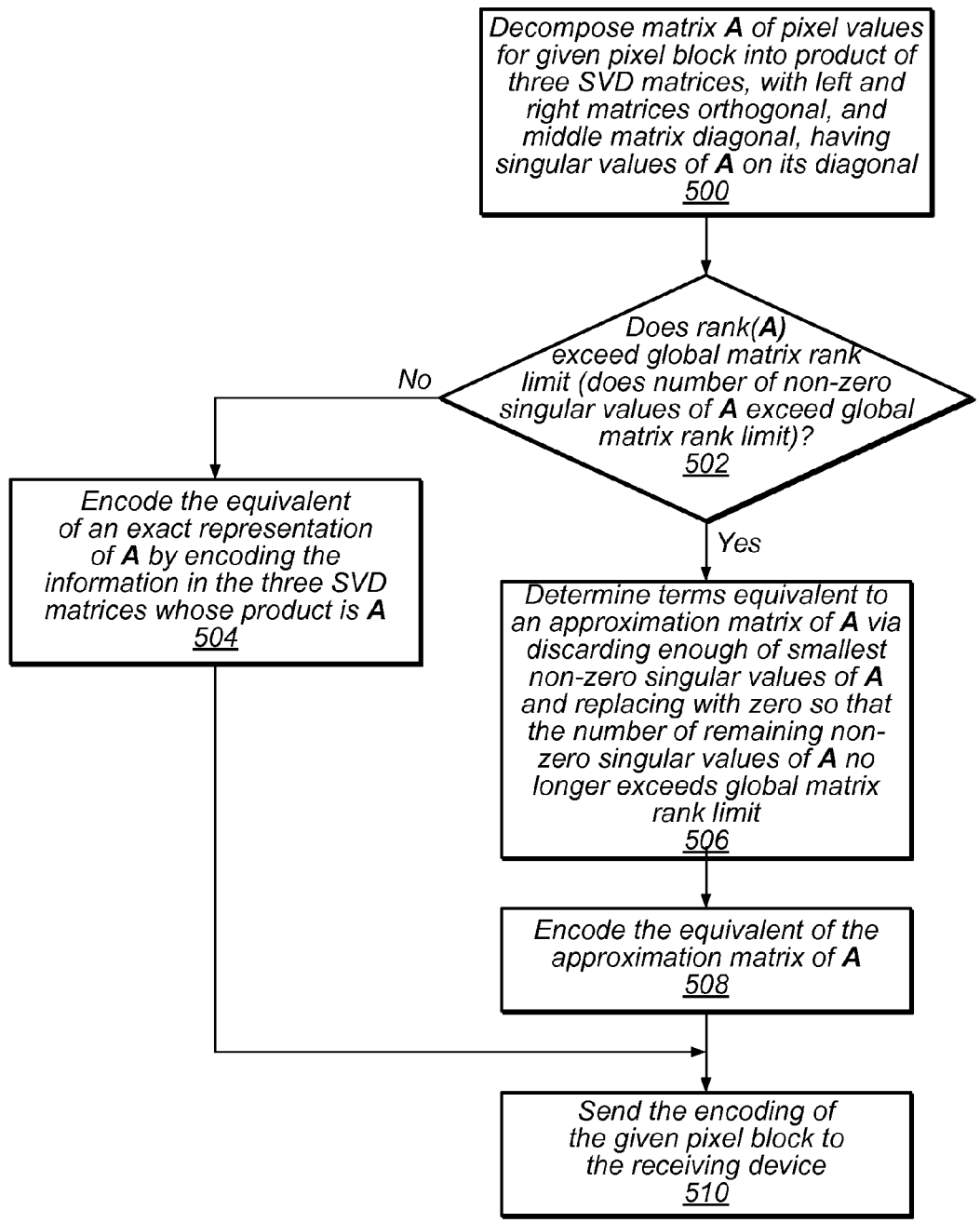
FIG. 5 is a flow diagram illustrating one embodiment of a method for encoding each given pixel block of a non-key video frame using singular value decomposition of a matrix of pixel values for the given pixel block.

FIG. 5 is a flow diagram that illustrates one embodiment of a method for encoding each given pixel block of a non-key video frame using singular value decomposition of a matrix of pixel values for the given pixel block, based on the principles described above. At process block 500, compression module 120 of encoding unit 110 decomposes the matrix A containing the pixel values for the given, currently-selected pixel block into a product of three singular value decomposition matrices, where the left and right matrices of the decomposition are orthogonal matrices, and the middle matrix $\Sigma$ of the decomposition is a diagonal matrix with the singular values of A displayed on its diagonal, as described above.

The remaining processing steps illustrated in FIG. 5 are determined based on comparing the rank of A with a positive integer which represents a matrix rank limit to be applied while encoding pixel blocks of non-key video frames of the sequence of video frames. See process block 302 of FIG. 3. The matrix rank limit may be set as a part of an initialization procedure executed to begin the processing of the sequence of video frames on video sending device 100. As discussed earlier, according to some embodiments, the matrix rank limit may be a global matrix rank limit to be applied in each encoding of a pixel block of a non-key video frame. According to other embodiments, the matrix rank limit may be adjustable during the processing of the sequence of video frames.

Encoding unit 110 determines, at decision block 502 of FIG. 5, whether the rank of the matrix A (where A is the matrix of pixel values for the given pixel block currently being encoded by compression module 120) exceeds the global matrix rank limit. In other words, at decision block 502 of FIG. 5, encoding unit determines whether the number of non-zero singular values exceeds the global matrix rank limit.

If the rank of A does not exceed the global matrix rank limit, then compression module 120 may encode the equivalent of an exact representation of A by encoding all of the information in the three SVD matrices whose product is A. That is, compression module 120 may not attempt to generate a lower-rank approximation to A, but instead may encode the full representation of A as a sum $\Sigma \sigma_i u_i v_i^T$ obtained via singular value decomposition of A. See process block 504 of FIG. 5. Since the rank of A is small enough, A can be compressed to satisfy the global matrix rank limit, and the compressed representation of A will still be exact.

If the rank of A does exceed the global matrix rank limit, then compression module 120 may generate an encoding for an approximation to the matrix A, rather than an encoding for an exact equivalent of A. As explained earlier, compression module 120 may determine terms equivalent to an approximation matrix of A by discarding enough of the smallest non-zero singular values of A and replacing them with zero so that the number of remaining non-zero singular values of A no longer exceeds global matrix rank limit. In other words, compression module 120 may represent an approximation matrix of A by truncating the full summation $\Sigma \sigma_i u_i v_i^T$, essentially replacing the smallest non-zero singular values $\sigma_i$ with zero, that is, discarding the terms in the sum containing the smallest non-zero singular values $\sigma_i$. The resulting approximation matrix has small enough rank to satisfy the compression criterion set by the global matrix rank limit, and still serves as a best-possible approximation of A, given the limitation imposed by the global matrix rank limit. Experiments show that such a reduced-rank approximation to A yields a result which is visually superior to results given by many other types of compression. See process block 506 of FIG. 5.

At process block 508 of FIG. 5, encoding unit 110 encodes an equivalent of the approximation matrix for A, such as the previously-described truncated summation of the form $\Sigma \sigma_i u_i v_i^T$. The exact manner of representing and encoding the reduced-rank matrix approximation to A may vary according to numerous embodiments, but the essential properties derived from singular value decomposition of the matrix A are preserved across the embodiments.

At process block 510 of FIG. 5, video sending device 100 sends the encoding of the given pixel block to a receiving device such as intermediate server 130 or receiving device 150.

The matrix rank limit governing decision block 502 of FIG. 5 may be regarded as a parameter or control that is applied to the pixel blocks of non-key video frames being compressed on video sending device 100. This control sets a balance between the degree to which a pixel block matrix is compressed to generate a compressed representation of the pixel block matrix, and the degree of accuracy with which the compressed representation approximates the block of pixel values that is being compressed. The matrix rank limit may be "dialed" up or down to adjust this balance, according to various embodiments. In some embodiments, the matrix rank limit is set as the processing of the video frames is initialized, and not adjusted afterwards, resulting in a global matrix rank limit. In some other embodiments, the matrix rank limit is adjusted during the processing of the video frames, as already explained above. The matrix rank limit may thus be interpreted as a control knob governing the compression of pixel blocks of non-key video frames.

Embodiments of video sending device 100 which implement both the spatiogram methods and the singular value decomposition methods described above are particularly effective in encoding a good representation of the sequence of video frames without expending undue processing resources, while at the same time sufficiently compressing the video frames to conserve bandwidth spent in transmitting the video frames to a receiving device. As described above, the spatiogram technique quickly provides an accurate assessment of which pixel blocks of a non-key video frame may be adequately represented by a corresponding pixel block in a previous video frame, and which pixel blocks of non-key video frames need to be separately encoded by video sending device 100. For those pixel blocks of non-key video frames which do need to be separately encoded by video sending device 100, singular value decomposition provides a very efficient and very accurate method for compressing those pixel blocks sufficiently to allow proper transmission while preserving, in their compressed representations, very accurate semblances of those pixel blocks.

Exemplary Computer System

It is contemplated that in some embodiments, any of the methods, techniques or components described above may be implemented as instructions and data capable of being stored or conveyed via a non-transitory computer-accessible medium. Such methods or techniques may include, for example and without limitation, the various methods for processing a sequence of video frames in a distributed video coding environment, including the encoding of representations of the video frames that will be sent to a receiving device, as described in the foregoing paragraphs. Any partition of the components illustrated in FIG. 1, or any other such array of components as may be implemented in various embodiments to perform the methods and techniques described above, may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

Figure 7:
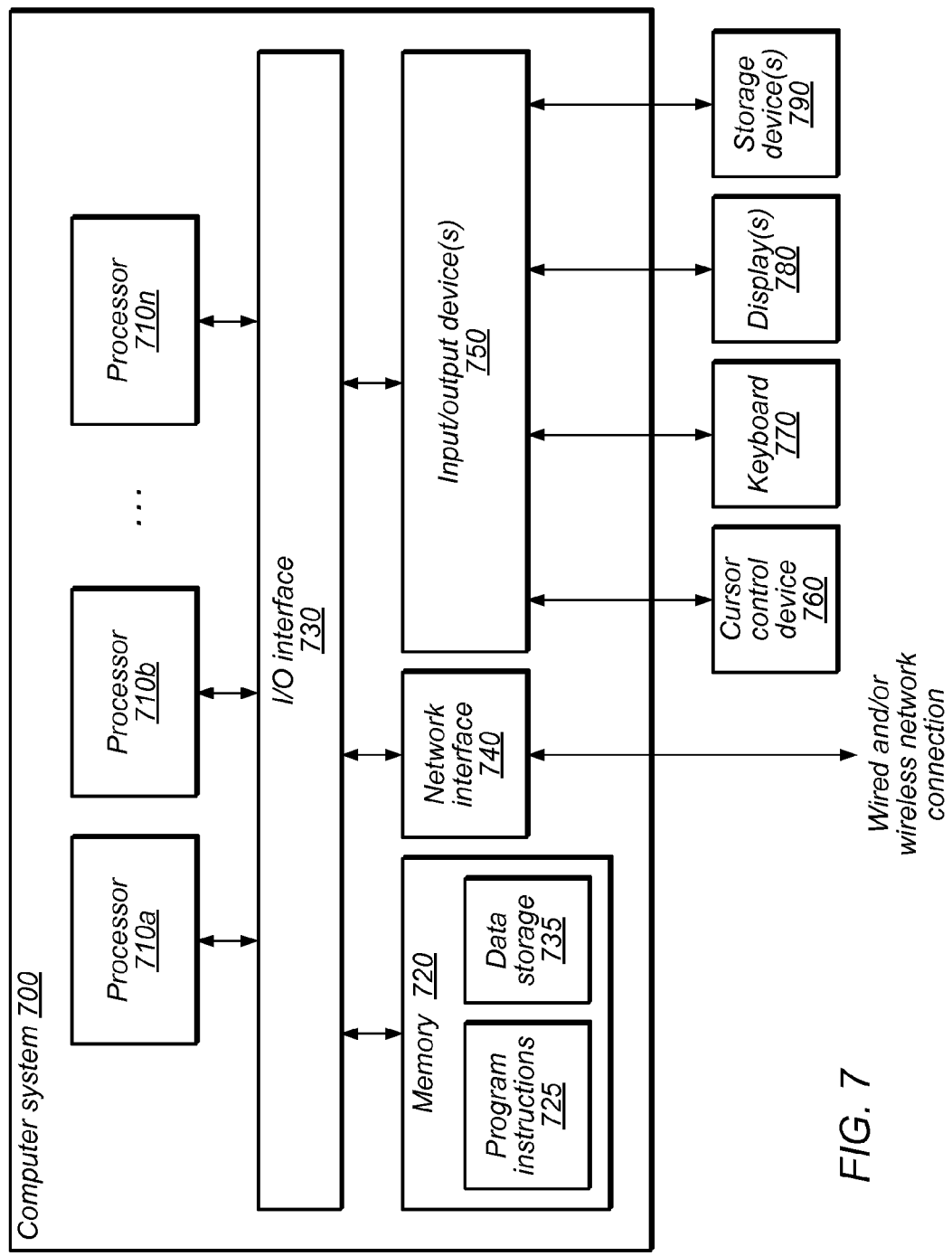
FIG. 7 is a block diagram illustrating an embodiment of a computer system implementing a distributed video coding environment.

One exemplary embodiment of a computer system including tangible, computer-accessible storage media is illustrated in FIG. 7. In the illustrated embodiment, computer system 700 includes one or more processors 710 coupled to a system memory 720 via an input/output (I/O) interface 730. Computer system 700 further includes a network interface 740 coupled to I/O interface 730. In different embodiments, system 700 may be variously configured as a desktop computer system, a laptop or notebook or netbook computer, a tablet computer, a mainframe computer system, a workstation, a network computer, a handheld computing device such as a video handheld transceiver, personal digital assistant, cellular phone, media player, or combination device, a camera, a set top box, a mobile device, a consumer device, a video game console, a handheld video game device, an application server, a storage device, a peripheral device such as a printer, copy machine, switch, modem, or router, or another type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 720 as program instructions 725 and data storage 735. It is noted that in some embodiments, program instructions 725 and data storage 735 may include instructions and data implementing desired functions that are not directly executable by processor 710 but are represented or encoded in an abstract form that is translatable to instructions that are directly executable by processor 710. For example, program instructions 725 may include instructions specified in an ISA that may be emulated by processor 710, or by other code executable on processor 710. Alternatively, program instructions 725 may include instructions, procedures or statements implemented in an abstract programming language that may be compiled or interpreted in the course of execution. As non-limiting examples, program instructions 725 may include code specified in a procedural or object-oriented programming language such as C or C++, a scripting language such as Perl or Ruby or Python, a markup language such as HTML or XML, or any other suitable language.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functioning of I/O interface 730, such as an interface to system memory 720, may be incorporated directly into processor 710.

Network interface 740 may be configured to allow data to be exchanged between computer system 700 and other devices attached to a network 750, such as other computer systems or communications devices, for example. In particular, network interface 740 may be configured to allow communication between computer system 700 and various external devices. These external devices may include various computing and communications devices, which may include elements similar to those of computer system 700. In particular, the external devices may include personal computers, telephony devices or network-attached computing devices that users may employ to access network services. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks, such as other types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a tangible, non-transitory computer-accessible storage medium configured to store instructions and data as described above. However, in other embodiments, instructions and/or data may be stored upon and retrieved from different types of computer-accessible storage media. Generally speaking, a non-transitory computer-accessible medium may include storage media or memory media such as magnetic or optical media, e.g., disk or CD/DVD-ROM coupled to computer system 700 via I/O interface 730. A non-transitory computer-accessible medium may also include any volatile or non-volatile media such as RAM (e.g. SDRAM, DDR SDRAM, RDRAM, SRAM, etc.), ROM, etc, that may be included in some embodiments of computer system 700 as system memory 720 or another type of memory. A non-transitory computer-accessible medium may generally be accessible via transmission media or signals such as electrical, electromagnetic, or digital signals, which may be conveyed via a communication medium such as a network and/or a wireless link, such as may be accessed via network interface 740.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
reconstructing, by a computing device, a sequence of video frames received from a sending device, in which at least some of the video frames are key video frames and others of the video frames are non-key video frames, at least one pixel block of at least one of the non-key video frames is indicated for reconstruction via a corresponding previous pixel block of a previous video frame, and at least one pixel block of at least one of the non-key video frames is not indicated for reconstruction via the corresponding previous pixel block of the previous video frame, said reconstructing comprises, for each video frame of the sequence of video frames:
if the video frame is a key video frame, then reconstructing the key video frame based on decoding an encoding of the key video frame, the encoding of the key video frame is received from the sending device; and if the video frame is a non-key video frame, then reconstructing the non-key video frame, said reconstructing comprises, for each particular pixel block of one or more pixel blocks of the non-key video frame:

if the particular pixel block is indicated for reconstruction via the corresponding previous pixel block of the previous video frame, then reconstructing the particular pixel block of the non-key video frame based on the corresponding previous pixel block of the previous video frame; and if the particular pixel block is not indicated for reconstruction via the corresponding previous pixel block of the previous video frame, then reconstructing the particular pixel block of the non-key video frame based on decoding an encoding of the particular pixel block of the non-key video frame received from the sending device, the encoding of the particular pixel block based at least in part on contents of the non-key video frame that contains the particular pixel block and not on contents of the previous key video frame, nor on contents of any other video frame positioned between the previous key video frame and the non-key video frame in the sequence of video frames.

2. The method of claim 1, wherein said indicating that the particular pixel block is to be reconstructed via the corresponding previous pixel block of the previous video frame, and said indicating that the particular pixel block is to not be reconstructed via the corresponding previous pixel block of the previous video frame, are received from the sending device.

3. The method of claim 1, wherein the encoding of the particular pixel block of the non-key video frame received from the sending device is based on a singular value decomposition, at the sending device, of a matrix of pixel values for the particular pixel block.

4. The method of claim 3, wherein the encoding of the particular pixel block of the non-key video frame received from the sending device is an encoding of an approximation matrix that approximates the matrix of pixel values for the particular pixel block based on discarding one or more non-zero singular values obtained in the singular value decomposition, wherein the rank of the approximation matrix is less than the rank of the matrix of pixel values for the particular pixel block.

5. The method of claim 1, wherein the sending device is mobile computing device.

6. The method of claim 1, wherein said reconstructing the sequence of video frames is performed by a server which:
encodes the reconstructed sequence of video frames; and
sends the encoding of the reconstructed sequence of video frames to a third device, wherein the third device:
is not the sending device and is not the server; and
is configured to decode the encoding of the reconstructed sequence of video frames and to display the reconstructed sequence of video frames.

7. The method of claim 6, wherein the third device is a mobile computing device.

8. A system, comprising:
a processor; and
a memory coupled to the processor, wherein the memory stores program instructions for:
reconstructing a sequence of video frames received from a sending device, in which at least some of the video frames are key video frames and others of the video frames are non-key video frames, at least one pixel block of at least one of the non-key video frames is indicated for reconstruction via a corresponding previous pixel block of a previous video frame, and at least one pixel block of at least one of the non-key video frames is not indicated for reconstruction via the corresponding previous pixel block of the previous video frame, said reconstructing comprises, for video frames of the sequence of video frames:

if the video frame is a key video frame, then reconstructing the key video frame based on decoding an encoding of the key video frame, the encoding of the key video frame received from the sending device; and if the video frame is a non-key video frame, then reconstructing the non-key video frame, said reconstructing comprising, for each particular pixel block of one or more pixel blocks of the non-key video frame:

if the particular pixel block is indicated for reconstruction via the corresponding previous pixel block of the previous video frame, then reconstructing the particular pixel block of the non-key video frame based on the corresponding previous pixel block of the previous video frame; and if the particular pixel block is not indicated for reconstruction via the corresponding previous pixel block of the previous video frame, then reconstructing the particular pixel block of the non-key video frame based on decoding an encoding of the particular pixel block of the non-key video frame received from the sending device, the encoding of the particular pixel block based on contents of the non-key video frame that contains the particular pixel block and not on contents of the previous key video frame, nor on contents of any other video frame positioned between the previous key video frame and the non-key video frame in the sequence of video frames.

9. The system of claim 8, wherein said indicating that the particular pixel block is to be reconstructed via the corresponding previous pixel block of the previous video frame, and said indicating that the particular pixel block is to not be reconstructed via the corresponding previous pixel block of the previous video frame, are received from the sending device.

10. The system of claim 8, wherein the encoding of the particular pixel block of the non-key video frame received from the sending device is based on a singular value decomposition, at the sending device, of a matrix of pixel values for the particular pixel block.

11. The system of claim 10, wherein the encoding of the particular pixel block of the non-key video frame received from the sending device is an encoding of an approximation matrix that approximates the matrix of pixel values for the particular pixel block based on discarding one or more non-zero singular values obtained in the singular value decomposition, wherein the rank of the approximation matrix is less than the rank of the matrix of pixel values for the particular pixel block.

12. The system of claim 8, wherein the sending device is mobile computing device.

13. The system of claim 8, wherein said reconstructing the sequence of video frames is performed by a server which:
encodes the reconstructed sequence of video frames; and
sends the encoding of the reconstructed sequence of video frames to a third device, wherein the third device:
is not the sending device and is not the server; and is configured to decode the encoding of the reconstructed sequence of video frames and to display the reconstructed sequence of video frames.

14. The system of claim 13, wherein the third device is a mobile computing device.

15. A tangible computer-readable storage device comprising instructions stored thereon that, responsive to execution by a computing device, causes the computing device to perform operations comprising:
   reconstructing a sequence of video frames received from a sending device, in which at least some of the video frames are key video frames and others of the video frames are non-key video frames, at least one pixel block of at least one of the non-key video frames is indicated for reconstruction via a corresponding previous pixel block of a previous video frame, and at least one pixel block of at least one of the non-key video frames is not indicated for reconstruction via the corresponding previous pixel block of the previous video frame, said reconstructing comprises, for video frames of the sequence of video frames:
      if the video frame is a key video frame, then reconstructing the key video frame based on decoding an encoding of the key video frame, the encoding of the key video frame received from the sending device; and
      if the video frame is a non-key video frame, then reconstructing the non-key video frame, said reconstructing comprises, for each particular pixel block of one or more pixel blocks of the non-key video frame:
         if the particular pixel block is indicated for reconstruction via the corresponding previous pixel block of the previous video frame, then reconstructing the particular pixel block of the non-key video frame based on the corresponding previous pixel block of the previous video frame; and
         if the particular pixel block is not indicated for reconstruction via the corresponding previous pixel block of the previous video frame, then reconstructing the particular pixel block of the non-key video frame based on decoding an encoding of the particular pixel block of the non-key video frame received from the sending device, the encoding of the particular pixel block based on contents of the non-key video frame that contains the particular pixel block and not on contents of the previous key video frame, nor on contents of any other video frame positioned between the previous key video frame and the non-key video frame in the sequence of video frames.

16. The tangible computer-readable storage device of claim 15, wherein said indicating that the particular pixel block is to be reconstructed via the corresponding previous pixel block of the previous video frame, and said indicating that the particular pixel block is to not be reconstructed via the corresponding previous pixel block of the previous video frame, are received from the sending device.

17. The tangible computer-readable storage device of claim 15, wherein the encoding of the particular pixel block of the non-key video frame received from the sending device is based on a singular value decomposition, at the sending device, of a matrix of pixel values for the particular pixel block.

18. The tangible computer-readable storage device of claim 17, wherein the encoding of the particular pixel block of the non-key video frame received from the sending device is an encoding of an approximation matrix that approximates the matrix of pixel values for the particular pixel block based on discarding one or more nonzero singular values obtained in the singular value decomposition, wherein the rank of the approximation matrix is less than the rank of the matrix of pixel values for the particular pixel block.

19. The tangible computer-readable storage device of claim 15, wherein the sending device is mobile computing device.

20. The tangible computer-readable storage device of claim 15, wherein said reconstructing the sequence of video frames is performed by a server which:
   encodes the reconstructed sequence of video frames; and
   sends the encoding of the reconstructed sequence of video frames to a third device, wherein the third device:
      is not the sending device and is not the server; and
      is configured to decode the encoding of the reconstructed sequence of video frames and to display the reconstructed sequence of video frames.

\* \* \* \* \*

UNITED STATES PATENT AND TRADEMARK OFFICE
CERTIFICATE OF CORRECTION

PATENT NO.        : 8,451,906 B1                      Page 1 of 1
APPLICATION NO.   : 13/035242
DATED             : May 28, 2013
INVENTOR(S)       : Shyam Sundar Rajagopalan et al.

It is certified that error appears in the above-identified patent and that said Letters Patent is hereby corrected as shown below:

In the Claims:

Column 23, Line 48, insert -- a -- after "...sending device is", therefor.

Column 24, Line 60, insert -- a -- after "...sending device is", therefor.

Column 26, Line 25, between "...one or more" and "singular values...", delete "nonzero" and insert -- non-zero --, therefor.

Column 26, Line 30, insert -- a -- between "...sending device is" and "mobile computing", therefor.

Signed and Sealed this
Fifth Day of November, 2013

Teresa Stanek Rea
*Deputy Director of the United States Patent and Trademark Office*